United States Patent [19]
Senn

[11] 3,780,253
[45] Dec. 18, 1973

[54] STRUCTURE FOR AND METHOD OF MESH WELDING

[76] Inventor: Charles Senn, 12633 Wilfred, Detroit, Mich. 48213

[22] Filed: Feb. 16, 1973

[21] Appl. No.: 333,217

[52] U.S. Cl. ............... 219/58, 219/56, 219/87, 219/89, 219/117 R
[51] Int. Cl. ............................................. B23k 11/10
[58] Field of Search .................. 219/56, 58, 87, 89, 219/91, 116, 117, 119

[56] References Cited
UNITED STATES PATENTS
| | | | |
|---|---|---|---|
| 2,929,915 | 3/1960 | Taylor et al. | 219/87 X |
| 3,463,895 | 8/1969 | Senn | 219/56 |
| 3,497,659 | 2/1970 | Ritter et al. | 219/58 X |

*Primary Examiner*—Bruce A. Reynolds
*Attorney*—Dale R. Small

[57] ABSTRACT

A plurality of cylindrical welding guns for welding wire mesh in contact with each other staggered on each side of a linear transversely extending member of the wire mesh having off-center electrodes secured thereto with welding portions engageable with the wire mesh and insulated fixed electrodes positioned beneath the welding guns and wire mesh, which welding guns and electrodes secured thereto in conjunction with said fixed electrodes are adapted to produce welds at any of 2, 3, 4 and 6 inch spacing on simultaneous actuation of all of the welding guns through a single actuating media circuit having a single intake and a single outlet manifold, with all welding guns electrodes active as either welding electrodes or to provide a return circuit for welding electrodes during welding operations at all spacings, said welding guns beins constructed and arranged to permit location of all transformer structure therefor on one side of the welding guns without special clearance structure.

9 Claims, 6 Drawing Figures

3,780,253

STRUCTURE FOR AND METHOD OF MESH WELDING

CROSS-REFERENCE TO RELATED APPLICATIONS

This application is related to previous U.S. Pat. Nos. 3,008,033 and 3,463,895 which are the closest known prior art relating to the present invention.

BACKGROUND OF THE INVENTION

1. Field of the Invention

The invention relates to welding guns and refers more specifically to apparatus for welding longitudinally extending linear members at selected spacing to transversely extending linear members to provide mesh for reinforcing concrete or the like using a plurality of known cylindrical welding guns arranged on one side of the mesh and all connected to be actuated through a single actuating circuit including a single inlet and outlet manifold while producing welds at a plurality of different spacings with each welding gun active during each weld and energized from the same side of the welding guns.

2. Description of the Prior Art

In the past, structure for producing longitudinally spaced apart welds on linear members such as wire for producing wire mesh to be used in reinforced concrete or the like have been particularly complicated. With prior structures, changing the spacing of the welds to produce mesh of different size has required down time of the welding structure of as much as 20 hours or more for each dimension change in the size of the mesh. Thus, change of size of mesh has been expensive in the past so that short runs of mesh of a particular size have not been accomplished economically.

The prior structure, as illustrated in U.S. Pat. No. 3,463,895, while a great improvement over the previous structures for welding wire mesh utilizing springs and the like, required separate manifold structure for each of the separate web spacings. Further, in the prior structure, all of the welding guns were not utilized during each weld at the different spacings. Also, welding guns were provided on opposite sides of the mesh and the transformer structure was connected to the welding guns on both sides of banks of welding guns.

SUMMARY OF THE INVENTION

In accordance with the present invention, there is provided an improved structure for and a method of welding longitudinally extending linear members at selected spacing to a transversely extending linear member, which welding may be repeated periodically to provide mesh for reinforcing concrete or the like. In the welding structure disclosed there is a bank of seven welding guns provided on one side of wire mesh to be welded which is repeated along each foot of the transversely extending linear member.

The welding guns are cylindrical, engage each other, and alternate welding guns are staggered on each side of the transversely extending linear member. Off-center electrodes are secured to each of the welding guns and include portions adapted to engage the linear members with the second and sixth electrode having two spaced apart portions engageable with the linear members at longitudinally spaced apart locations. The electrodes are engageable with the transversely extending linear member at the start of each foot thereof and at locations 2, 3, 4, 6, 8, 9, 10 and 12 inches from the start of each foot thereof.

Stationary electrodes are positioned beneath the welding guns on the opposite side of the mesh being produced for engagement with the electrodes on the welding guns through the linear members, with the first of the stationary electrodes being engageable with the electrodes on the first and second welding gun, the second stationary electrode being engageable with the electrodes on the third and fourth welding guns, the third stationary electrode being engageable with the electrodes on the fifth and sixth welding guns, and the fourth stationary electrode being engageable with the electrode on the seventh welding gun and providing a return electrical path for the electrical circuit through the electrode on the seventh welding gun.

A single pneumatic circuit including one inlet and one outlet manifold actuates all of the welding guns simultaneously during each weld, in accordance with the present invention, regardless of the weld spacing required. Further, all of the welding guns are active in each weld regardless of weld spacing to either provide welds or a return path for a welding circuit.

In addition, the welding guns are so constructed and arranged to permit mounting of all of the welding transformers for each of the seven welding guns on one side of the welding guns. Thus, access to the welding electrodes is facilitated.

DESCRIPTION OF THE PREFERRED EMBODIMENT

Figure 1:
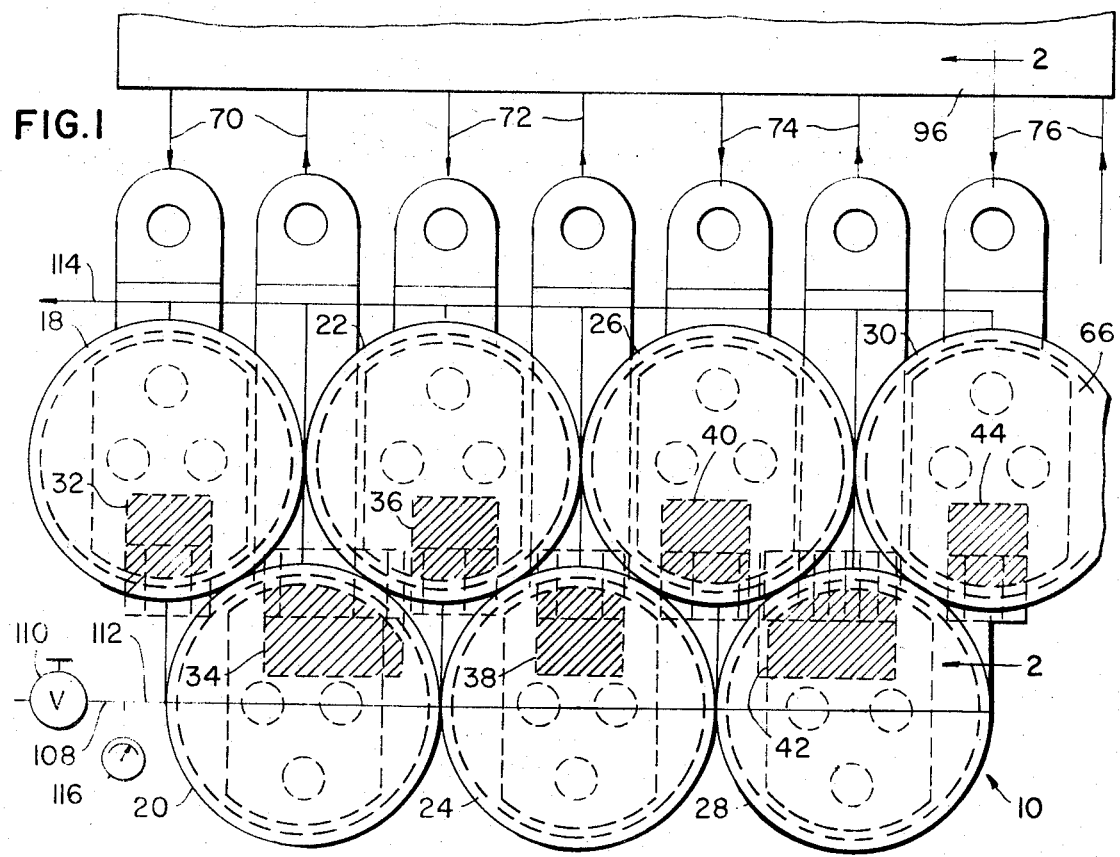
FIG. 1 is a top view of a one-foot bank of welding apparatus constructed in accordance with the invention for performing the method of the invention.
Figure 2:
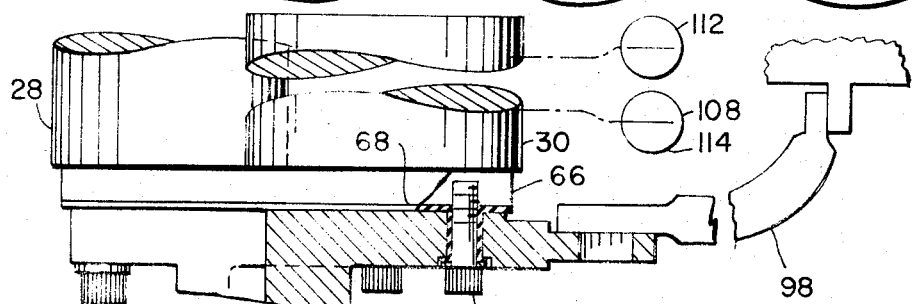
FIG. 2 is a partial section view of the welding apparatus illustrated in FIG. 1.

The welding apparatus bank 10 illustrated in FIG. 1 is suitable for welding a 1-foot width of wire mesh generally indicated 12 in FIG. 2 which includes the longitudinally extending wire members 14 and the transversely extending wire members 16. In producing reinforcing wire mesh for concrete and the like, a bank of welding apparatus 10 would be provided for each foot of width of the reinforcing mesh. Each bank would be a duplicate of the welding apparatus bank 10 so that only the first foot of the welding apparatus bank 10 is disclosed in detail herein.

The welding apparatus bank 10 as shown in FIG. 1 includes seven cylindrical welding guns 18, 20, 22, 24, 26, 28 and 30. The seven welding guns are the welding guns of previous U.S. Pat. No. 3,008,033 and include a stationary outer cylinder and piston and an inner cylinder which moves axially of the stationary outer cylinder between the outer cylinder and piston. With such structure, eccentric electrodes may be secured thereto without undue stress on and wear of the cylinders and piston of the welding gun structure to produce leakage and therefore early failure of the gun structure. The individual welding gun structure is set forth in detail in the above referenced patent, the disclosure of which is incorporaed herein by reference. The details of the welding guns will not therefore be considered further herein.

As shown best in FIGS. 1 and 2, separate upper electrode members 32, 34, 36, 38, 40, 42 and 44 are secured to the respective welding guns 18, 20, 22, 24, 26, 28 and 30 by convenient means such as the bolts 46 shown best in FIG. 2. The electrodes 32, 36, 38, 40 and 44 are provided with single wire engaging portions 48, 54, 56, 58 and 64, respectively, engageable with the longitudinally extending linear members 14, as shown best in FIG. 3, at spaced apart locations along each transversely extending member. Each of the electrodes 34 and 42 have two wire engaging portions 50 and 52 and 60 and 62. All of the upper electrodes are eccentric with respect to the axis of the particular welding gun to which they are attached and are shaped generally as shown in FIG. 2 in transverse cross section. Also, the upper electrodes are insulated from the bolts 46 and the respective electrode mounting members 66 connected to the inner cylinder of each of the welding guns for movement therewith and are thus insulated from the welding guns to which the electrode mounting members 66 are secured by the insulating material 68, shown best in FIG. 2.

As shown best in FIG. 1, the welding guns 18, 20, 22, 24, 26, 28 and 30 of the welding apparatus bank 10 are staggered on opposite sides of a transversely extending linear member 16 and are in engagement with each other. The electrodes are offset sufficiently to place the wire engaging portions of the electrodes over the transversely extending linear members. Such positioning of the welding guns and offset construction and installation of the electrodes permits the welding apparatus bank 10 to be constructed in a minimum amount of space.

In accordance with the invention, the electrode mounting members 66 are shaped in plan view as shown in dotted lines in FIG. 1 whereby adjacent upper electrodes may all be terminated at one side of the welding guns, as shown particularly in FIG. 1. With such construction, the electrodes 34, 38 and 42 extend between the electrodes 32, 36, 40 and 44 with transverse clearance of for example one-eighth of an inch between adjacent electrode mounting members and electrodes.

Such construction permits mounting of all the electrical transformer structure 96 for supplying power to the welding guns 18, 20, 22, 24, 26, 28 and 30 on one side of the bank of welding apparatus 10 whereby easy access is permitted to the electrodes from one side of the welding guns. As shown best in FIG. 3, electrodes 32 and 34 form a first electrical circuit 70 with the linear members 14 and 16, electrodes 36 and 38 are connected together in a second electrical circuit 72, while electrodes 40 and 42 are connected in a third electrical circuit 74, and electrode 44 is connected in a fourth electrical circuit from the transformer structure 96.

The electrical circuits 70, 72, 74 and 76 are completed with the aid of four bottom stationary electrodes 78, 80, 82 and 84, respectively. Each of the bottom stationary electrodes is positioned on a bed 86, is secured thereto by bolts 88, and is insulated therefrom by insulating material 90. The electrodes 78, 80, 82 and 84, as shown best in FIGS. 2 and 3, support the transversely extending linear members 16 during welding thereof to the longitudinally extending linear members. Both the upper and lower electrodes may be cooled by fluid flow therethrough through the openings 92 and 94, respectively, provided therein.

As shown best in FIG. 2, the upper electrodes are connected to the transformer structure 96 for supplying electrical power to the welding guns through separate electrical cables 98 connected at the opposite ends to the upper electrodes and the transformer structure by convenient means such as bolts or the like (not shown).

As shown best in FIG. 2, guides for the linear members 14 and 16 such as the guide 100 may be secured to the bed 86 of the welding apparatus bank 10 by bolts 104 and insulated from the bed by insulating material 106. The guides 100 are provided as desired and are not themselves part of the present invention so that they will not be considered in detail herein.

It will further be noted that the apparatus for feeding both the longitudinal and transversely extending linear members are similarly not part of the present invention and are well known in the prior art so that they will not be considered in detail herein.

All of the welding guns 18, 20, 22, 24, 26, 28 and 30 are in accordance with the present invention actuated from a single pneumatic circuit 108. The circuit 108 includes an air pressure regulating valve 110 connected to a source of air under pressure (not shown), a single inlet manifold 112 is connected to each of the welding guns to apply air under regulated pressure such as eighty pounds per square inch to the top of the welding guns whereby a pressure of approximately 1,930 pounds is provided at the weld with a 19.3 square inch welding gun cylinder. Similarly, a single exhaust manifold 114 is provided connected to each of the cylinders for removal of air therefrom. An air gauge 116 is provided connected between the air pressure regulating valve 110 and the intake manifold 112 to indicate the air pressure applied to the welding guns on actuation thereof.

Thus, in operation, all of the welding guns 18, 20, 22, 24, 26, 28 and 30 are actuated under the same pressure and at the same time during each welding cycle regardless of the spacing of the wire mesh being welded. Further, each welding gun is active in each weld as will be considered subsequently in the overall operation of the welding apparatus bank 10.

Figure 3A:
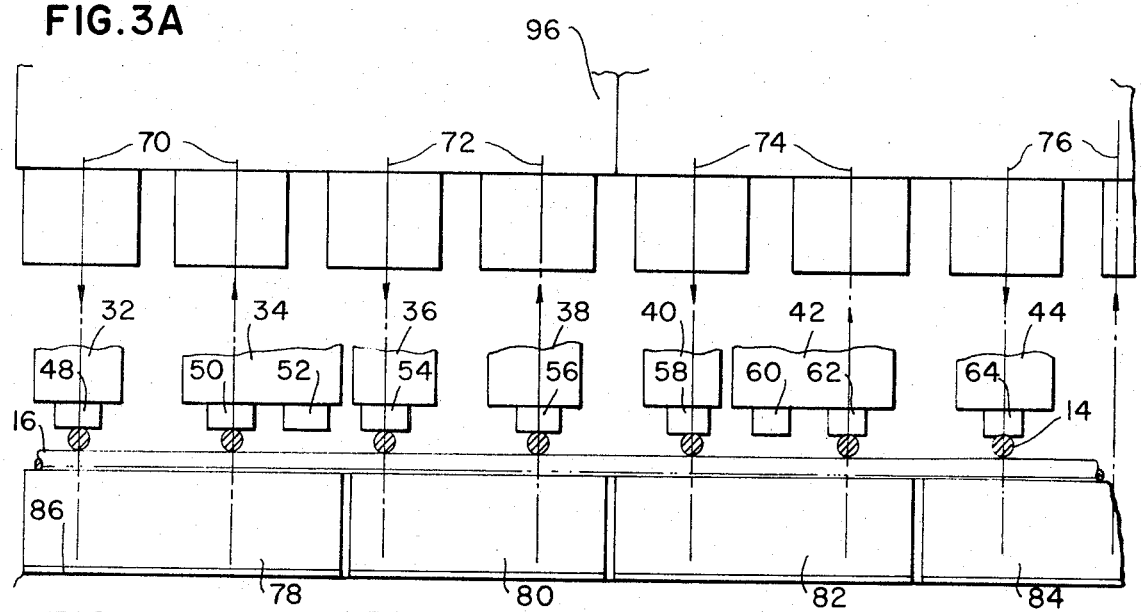
FIGS. 3A, 3B, 3C and 3D are diagrammatic views of the welding apparatus illustrated in FIGS. 1 and 2 as used in 2, 3, 4 and 6 inch weld spacing, respectively.
Figure 3B:
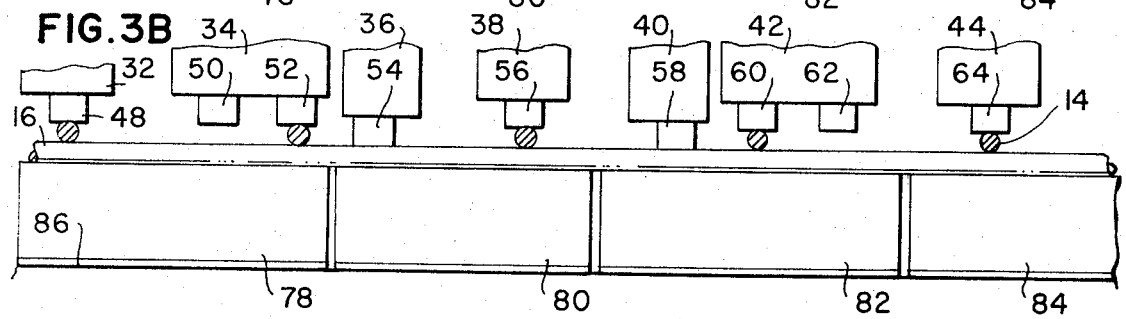
Figure 3C:
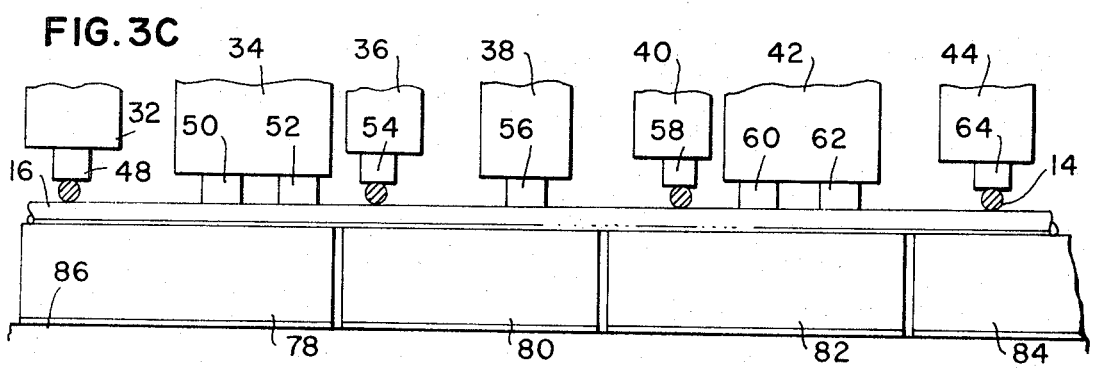
Figure 3D:
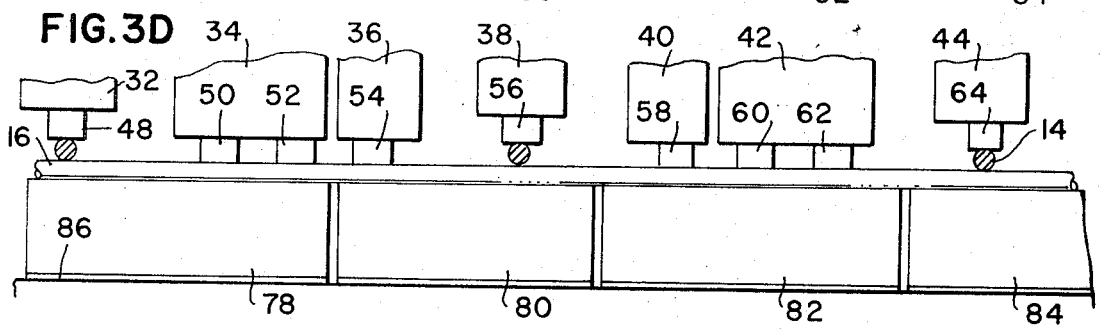

In overall operation of the welding apparatus bank 10 and with particular reference to FIG. 3, the longitudinally extending and transversely extending linear members 14 and 16 are fed between the upper and lower electrodes in a known manner, as shown for example in FIGS. 3A, 3B, 3C and 3D, for wire mesh having 2, 3, 4 and 6 inch spacing, respectively. Air pressure is applied to the welding guns 18, 20, 22, 24, 26, 28 and 30 simultaneously through the single manifold 112 and all of the upper electrodes are caused to engage the longitudinally or transversely extending linear members in accordance with the diagrams 3A through 3D, whereby welding is effected in each of the separate circuits 70, 72, 74 and 76 connected to the transformer structure 96.

Wherein there is no longitudinally extending member, as for example beneath the wire engaging electrode portions 52 and 60 in FIG. 3A and beneath the electrode portions 54 and 58 in FIG. 3B, the upper electrodes continue downwardly until they contact the transversely extending linear member. Such upper electrodes act as return paths for the welding circuits.

Thus, in each welding circuit, with any of the 2, 3, 4 or 6 inch mesh spacing, as shown in FIGS. 3A through 3D, all welding guns are active.

With such operation, it will be noted that the additional movement of any upper electrode is only the thickness of one linear member of the wire mesh which is less than the thickness of the electrode mounting members 66. Therefore, no special structure is required to permit the extension of all of the upper electrodes to one side of the welding guns as shown in FIG. 1.

Thus, it will be understood that in accordance with the present invention there is provided a particularly simple, economical and efficient structure for welding wire mesh of 2, 3, 4 and 6 inch spacings in which welding guns are needed on only one side of the mesh and in which all electrical connections may be effected from one side of the welding guns. Further, in accordance with the invention, all guns are actuated during each welding cycle simultaneously through a single input and a single outlet manifold, and all welding guns are active in each welding cycle, either in effecting a weld or providing a return path for the welding circuit.

While one embodiment of the invention has been considered in detail, it will be understood that other embodiments and modifications thereof are contemplated by the inventor. Thus, it is not essential the activating media be air. It may be oil or the like. It is the intention to include all embodiments and modifications as are defined by the appended claims within the scope of the invention.

What I claim as my invention is:

1. Apparatus for welding longitudinally extending linear members at selected spacing to a transversely extending linear member such as in mesh for reinforcing concrete or the like, comprising a plurality of cylindrical welding guns positioned along a length of the transversely extending linear member staggered on each side of the transversely extending linear member, each of said guns being in contact with the immediately adjacent guns, upper electrodes secured to the welding guns positioned off-center of the welding guns over the transversely extending linear member, a plurality of stationary electrodes positioned beneath the welding guns along the transversely extending linear member, and a single means for simultaneously actuating all of the welding guns at the same time to bring all of the electrodes into engagement with either the longitudinally or transversely extending linear members whereby all of the welding guns are active during welds without regard to the spacing between adjacent parallel linear members.

2. Structure as set forth in claim 1, wherein the single means for actuating all of the welding guns at one time comprises a single manifold for passing an actuating medium into the welding guns and a single manifold for withdrawing an actuating medium therefrom.

3. Structure as set forth in claim 1, wherein all of the welding guns are positioned on one side of the mesh.

4. Structure as set forth in claim 3, wherein stationary electrodes are provided on the other side of the mesh, which stationary electrodes are insulated from their mounting structure.

5. Structure as set forth in claim 1, wherein transformers are provided for each separate welding gun to provide electrical energy therefor and all of the transformers are located on one side of the welding guns.

6. Structure as set forth in claim 1, wherein seven welding guns are positioned over each foot of the transversely extending linear member each having a separate electrode connected thereto and four stationary lower electrodes are provided extending along each foot of the transversely extending linear member and on the opposite side of the mesh from the welding guns.

7. Structure as set forth in claim 6, wherein the upper electrode secured to the first welding gun has a portion engageable with the linear members at the start of the foot of the transversely extending linear member, the upper electrode secured to the second welding gun includes separate portions enegageable with the transversely extending linear members at two and three inches from the first electrode portion, the upper electrode secured to the third welding gun has a portion engageable with the linear members at 4 inches from the portion of the first electrode, the upper electrode secured to the fourth welding gun has a portion engageable with the linear members at 6 inches from the portion of the first electrode, the electrode secured to the fifth welding gun has a portion engageable with the linear members at 8 inches from the portion of the first electrode, the electrode secured to the sixth welding gun has separate portions engageable with the linear members at 9 and 10 inches from the portion of the first electrode, and the electrode secured to the seventh welding gun has a portion engageable with the linear members 12 inches from the portion of the first electrode.

8. Structure as set forth in claim 6, wherein the first fixed electrode is positioned below the electrodes on the first and second welding guns, the second fixed electrode is positioned below the electrodes on the third and fourth welding guns, the third fixed electrode is positioned below the electrodes on the fifth and sixth welding guns, and the fourth fixed electrode is positioned below the electrode on the seventh welding gun and is connected to provide a return electrical path therefor.

9. The method of welding longitudinally extending linear members at selected spacing to a transversely extending linear member such as in mesh for reinforcing concrete or the like, comprising positioning a plurality of welding guns over the transversely extending linear member capable of producing welds at different spaced apart locations on the transversely extending linear member and actuating all of the welding guns simultaneously through a single inlet and a single outlet manifold in a single circuit for the actuating media therefor wherein all of the welding guns are active during each weld performed without regard to different weld spacing with the welding guns not actually producing a weld during each weld perpormed being used as a return electrical path for the welding guns actually producing welds.

\* \* \* \* \*